US009418309B2

(12) United States Patent
Tafazoli Bilandi et al.

(10) Patent No.: US 9,418,309 B2
(45) Date of Patent: Aug. 16, 2016

(54) METHOD AND APPARATUS FOR PERFORMING A FRAGMENTATION ASSESSMENT OF A MATERIAL

(71) Applicant: MOTION METRICS INTERNATIONAL CORP., Vancouver (CA)

(72) Inventors: Shahram Tafazoli Bilandi, Vancouver (CA); Mohammad Sameti, Coquitlam (CA); Nima Ziraknejad, North Vancouver (CA); Aylin Azmin, Vancouver (CA); Ian Law Bell, North Vancouver (CA); Hou-Yin Daniel Ko, North Vancouver (CA)

(73) Assignee: Motion Metrics International Corp., Vancouver, CA (US)

( * ) Notice: Subject to any disclaimer, the term of this patent is extended or adjusted under 35 U.S.C. 154(b) by 31 days.

(21) Appl. No.: 14/488,033

(22) Filed: Sep. 16, 2014

(65) Prior Publication Data

US 2015/0078653 A1    Mar. 19, 2015

Related U.S. Application Data

(60) Provisional application No. 61/878,906, filed on Sep. 17, 2013.

(51) Int. Cl.
  *G06K 9/00*  (2006.01)
  *G06K 9/46*  (2006.01)

(52) U.S. Cl.
  CPC .......... *G06K 9/4604* (2013.01); *G06K 9/00201* (2013.01); *G06K 9/00208* (2013.01)

(58) Field of Classification Search
  None
  See application file for complete search history.

(56) References Cited

U.S. PATENT DOCUMENTS

| 7,020,307 | B2 | 3/2006 | Hinton et al. | |
| 8,233,667 | B2 | 7/2012 | Helgason et al. | |
| 2010/0017115 | A1* | 1/2010 | Gautama | G01C 21/28 701/533 |
| 2010/0182400 | A1* | 7/2010 | Nelson | G06T 7/0018 348/42 |
| 2010/0208981 | A1* | 8/2010 | Minear | G06T 11/001 382/154 |
| 2013/0236064 | A1* | 9/2013 | Li | G01V 1/30 382/109 |

(Continued)

FOREIGN PATENT DOCUMENTS

| JP | 2007-198867 A | 8/2007 |
| JP | 2014-95644 A | 5/2014 |

OTHER PUBLICATIONS

Pötsch, et al. (Designing and optimising surface blasts using 3D images), pp. 41-47, CRC Press 2012.*

(Continued)

*Primary Examiner* — Daniel Mariam
(74) *Attorney, Agent, or Firm* — Lewis Roca Rothgerber Christie LLP

(57) ABSTRACT

A method and apparatus for performing a fragmentation assessment of a material including fragmented material portions is disclosed. The method involves receiving two-dimensional image data representing a region of interest of the material, and processing the 2D image data to identify features of the fragmented material portions. The method also involves receiving a plurality of three dimensional point locations on surfaces of the fragmented material portions within the region of interest, identifying 3D point locations within the plurality of three dimensional point locations that correspond to identified features in the 2D image, and using the identified corresponding 3D point locations to determine dimensional attributes of the fragmented material portions.

54 Claims, 8 Drawing Sheets

(56) References Cited

U.S. PATENT DOCUMENTS

| | | | | |
|---|---|---|---|---|
| 2014/0253679 A1* | 9/2014 | Guigues | ............... | G01S 17/89 348/42 |
| 2015/0163473 A1* | 6/2015 | Osawa | ............... | H04N 13/044 348/53 |

OTHER PUBLICATIONS

Cho, et al. (Fragment Size Distribution in Blasting), pp. 951-956, 2003.*

Moser, et al. (3D Stereophotogrammetry for Blast Design and Control), 3-11, 2007.*

Cheung, et al. (An on Line Fragment Size Analyzer Using Image Processing Techniques), pp. 233-238, 1990.*

UK Combined Search and Examination Report dated Sep. 14, 2015 in corresponding British application No. GB 1504177.5, 6 pages.

Badge, M.N., et al., "Rock mass characterization by fractal dimension", Engineering Geology, vol. 63, 2002, pp. 141-155.

Chow, Edmond, et al, "Automation of Rock Fragmentation Analysis", Proc. of 38th ISEE Annual Conference on Explosives and Blasting Techniques, 2012, Nashville, TN, International Society of Explosive Engineers, 10 pages.

Chow, Edmond, et al., "Measuring Blast Fragmentation by Analyzing Shovel Bucket Contents", Proc. of the 37th ISEE Annual Conference on Explosives and Blasting Techniques, 2011, San Diego, CA, 10 pages.

Farmer, Ian W. et al., "Analysis of rock fragmentation in bench blasting using digital image processing", 1991, Proc. of the 7th International Congress on Rock Mechanics, Aaechen, Germany, pp. 1037-1042.

Dislaire, G., et al., "Surfometric imaging for dimensional analysis of individual aggregates and bulk samples", Measurement and Analysis of Blast Fragmentation, 2013, pp. 33-39, CRC Press, ISBN 978-0-415-62140-3.

Kemeny, John M., et al., "Practical technique for determining the size distribution of blasted benches, waste dumps and heap leach sites", Mining Engineering, Nov. 1994, pp. 1281-1284.

Maerz, Norbert, H., "Image Sampling Techniques and Requirements for automated image analysis of rock fragmentation", Proceedings of the FRAGBLAST-5 Workshop on Measurement of Blast Fragmentation, Montreal, Quebec, Canada, 1996, pp. 115-120.

Maerz, Norbert H., et al., "Fragmentation Measurement for Experimental Blasting in Virginia", Proc. of the 3rd Mini-Symposium on Explosives and Blasting Research, 1987, pp. 56-70.

McKee, D.J., et al., "The Relationship Between Fragmentation in Mining and Comminution Circuit Throughput", Materials Engineering, vol. 8, No. 11, pp. 1265-1274, 1995.

Noy, M.J., et al., "Automated rock fragmentation measurement with close range digital photogrammetry", Measurement and Analysis of Blast Fragmentation, pp. 13-21, 2013, CRC Press, ISBN 978-0-415-62140-3.

Palangio, T.W., et al., "Advanced automated optical blast fragmentation sizing and tracking", Proc. of European Fed. of Explosives Engineers Brighton Conference, 2005, pp. 259-267, ISBN 0-9550290-0-7.

Pierson, Lawrence A., et al., "Rockfall Catchment Area Design Guide, Final Report SPR-3(032)", Oregon Department of Transportation-Research Group; Federal Highway Administration, 2001, 92 pages.

Raina, A.K., "A history of digital image analysis technique for blast fragmentation assessment and some Indian contributions", Measurement and Analysis of Blast Fragmentation, 2013, pp. 3-11, CRC Press, ISBN 978-0-415-62140-3.

Sameti, Bahram, et al., "Application of Automated and Centralized Rock Fragmentation Analysis", Proc. of 39th ISEE Annual Conference on Explosives and Blasting Techniques, 2013, Fort-Worth, TX, 9 pages.

Sellers, E., et al., "A Quantitative Triple Bottom Line Mine to Mill Process Evaluator", Proc. of 38th ISEE Annual Conference on Explosives and Blasting Techniques, 2012, Nashville, TN, 10 pages.

Smith, Martin L., et al., "Blast Fragmentation and Model Evaluation Via Image Analysis", Proc. of the Emerging Computer Techniques Technical Program, SME Annual Meeting, 1993, Reno, NV, pp. 229-238.

Tafazoli, Shaiiram, et al., "An in-Shovel Camera-based Technology for Automatic Rock Size Sensing and Analysis in Open Pit Mining", Proceedings of the 3rd CANUS Rock Mechanics Symposium, 2009, Toronto, Canada, paper 4343, pp. 1-8.

Thurley, M.J., "Automated, on-line, calibration-free, particle size measurement using 3D profile data", Measurement and Analysis of Blast Fragmentation, 2013, pp. 23-32, CRC Press, ISBN 978-0-415-62140-3.

Workman, Lyall, et al., "The Effects of Blasting on Crushing and Grinding Efficiency and Energy Consumption", Proc. of 30th Annual Conf. on Explosives and Blasting Research, 2003, 10 pages.

Wu, Xingqiang, et al., "A Segmentation Method for Multi-Connected Particle Delineation", Proceedings of the IEEE Workshop on Applications of Computer Vision, 1992, Los Alamitos, CA, IEEE Computer Society Press, pp. 240-247.

* cited by examiner

METHOD AND APPARATUS FOR PERFORMING A FRAGMENTATION ASSESSMENT OF A MATERIAL

BACKGROUND OF THE INVENTION

1. Field of Invention

This invention relates generally to image processing and more specifically to processing images of a material to perform a fragmentation assessment of the material.

2. Description of Related Art

Image-based rock fragmentation analysis methods use image segmentation techniques to delineate the edges of the rocks in the image. In many available image-based rock fragmentation analysis systems, rock delineation results are converted into physical rock sizes by introducing one or more reference objects, such as basketballs, into the region of interest as size-scaling references. The known reference object is then used to scale the results. In many cases access to the fragmented rock for placing the reference objects may be prohibited or difficult. Alternatively two or more parallel laser beams may be projected onto the region of interest to permit scaling of the results.

There remains a need for improved methods and apparatus for performing fragmentation assessments of materials.

SUMMARY OF THE INVENTION

In accordance with one disclosed aspect there is provided a method for performing a fragmentation assessment of a material including fragmented material portions. The method involves receiving two-dimensional image data representing a region of interest of the material, processing the 2D image data to identify features of the fragmented material portions, receiving a plurality of three dimensional point locations on surfaces of the fragmented material portions within the region of interest, identifying 3D point locations within the plurality of three dimensional point locations that correspond to identified features in the 2D image, and using the identified corresponding 3D point locations to determine dimensional attributes of the fragmented material portions.

Receiving the plurality of 3D point locations may involve receiving 3D point locations from a 3D sensor operable to generate a 3D point cloud of the region of interest.

The method may involve determining a distance between the 3D sensor and a reference 3D point location within the region of interest.

The method may involve determining a spatial orientation of the identified 3D point locations and processing the 3D point cloud to determine slope attributes associated with the region of interest of the material, the slope attributes including at least one of a slope angle associated with the region of interest of the material, and a slope height associated with the region of interest of the material, and the method may involve using the dimensional attributes of the fragmented material portions and the slope attributes to determine slope stability.

The method may involve generating a warning signal when one of the distance between the 3D sensor and a reference 3D point location within the region of interest is less than a safe working distance of the region of interest, or the determined slope stability is less than a minimum required slope stability.

Receiving the plurality of 3D point locations may involve receiving at least two 2D images representing different perspective viewpoints of the region of interest, and processing the at least two 2D images to determine the 3D point locations.

Receiving at least two 2D images may involve receiving 2D images from respective image sensors disposed in spaced apart relation to each other.

Receiving at least two 2D images may involve receiving a first 2D image from a first image sensor and selectively receiving a second image from one of a second image sensor and a third image sensor, the second image sensor being spaced apart from the first image sensor by a first fixed distance and the third image sensor being spaced apart from the first image sensor by a second fixed distance, the second fixed distance being greater than the first fixed distance.

The method may involve determining a degree of disparity value between corresponding pixels in the at least two 2D images, the degree of disparity value providing an indication of a suitability of the 2D images for processing to determine the 3D point locations and may further involve displaying the degree of disparity value on a display.

Processing the 2D image data to identify image features may involve identifying 2D boundaries associated with the fragmented material portions and identifying 3D point locations may involve correlating 3D point locations that are located on or proximate to the identified 2D boundaries of the fragmented material portions.

Using the identified 3D point locations to determine dimensional attributes may involve, for each fragmented material portion, determining dimensions of the fragmented material portion based on 3D point locations that are located on or proximate to the identified 2D boundaries of the fragmented material portions.

Processing the 2D image data to identify image features of the fragmented material portions may involve using the identified 3D point locations to identify boundaries between fragmented material portions in the 2D image data.

The method may involve displaying at least one of the 2D image, a preview of the 2D image, a processed view of the 2D image providing an indication of fragmented material portions within the region of interest, a fragmented material portion size attribute, a fragmented material portion volume attribute, a distance between a fragmented material portion and a 3D sensor operable to generate the 3D point locations, a determined slope stability associated with the region of interest of the material, a 3D representation of an orientation of the region of interest, and a view of the 2D image superimposed on a surface of the 3D representation.

Using the identified 3D point locations to determine dimensional attributes may involve using the identified 3D point locations to determine a scale associated with at least some of the identified image features in the 2D image data.

Using the identified 3D point locations to determine a scale associated with identified image features may involve using the identified 3D point locations to determine a scale associated with each identified image feature in the 2D image data.

Using the identified 3D point locations to determine dimensional attributes may involve using the identified 3D point locations to determine an orientation of the region of interest in the 2D image data.

Using the identified 3D point locations to determine dimensional attributes may involve using the identified 3D point locations to estimate a volume of each of the fragmented material portions.

Using the identified 3D point locations to determine dimensional attributes may involve using the identified 3D point locations to estimate a fragment size associated with each of the fragmented material portions.

The method may involve generating a fragment size distribution based on the determined fragment size for the fragmented material portions within the region of interest.

The method may involve converting the fragment size distribution into a corresponding sieve analysis result.

The method may involve determining a spatial orientation of the identified 3D point locations.

The two-dimensional image data and the plurality of three dimensional point locations may be acquired by at least one sensor and the method may further involve determining a spatial orientation of the at least one sensor and determining the location of the identified 3D point locations may involve determining the location of the identified 3D point locations with respect to the sensor.

The method may involve determining a position of the at least one sensor by receiving a global positioning system (GPS) signal.

Determining the orientation of the at least one sensor may involve receiving an orientation signal from at least one of a magnetic field sensor, accelerometer, and a gyroscope.

Receiving the two-dimensional image data and receiving the plurality of three dimensional point locations may involve receiving a first dataset and the method may further involve receiving at least one additional dataset including two-dimensional image data representing the region of interest of the material and an associated plurality of three dimensional point locations within the region of interest and using identified 3D point locations to determine dimensional attributes may involve using identified 3D point locations from each of the first dataset and at least one additional dataset to determine the dimensional attributes of the fragmented material portions.

The first dataset and the at least one additional dataset may be acquired from different perspective viewpoints.

The method may involve using the identified 3D point locations in the first dataset and the at least one additional dataset to estimate an overall volume of a stockpile of fragmented material portions.

Receiving the two-dimensional image data and receiving the plurality of three dimensional point locations may involve receiving a first dataset representing a first region of interest and the method may further involve receiving at least one additional dataset including two-dimensional image data representing at least one additional region of interest and an associated plurality of three dimensional point locations within the additional region of interest, using identified 3D point locations to determine dimensional attributes within each of the first region of interest and the additional region of interest, and generating a location map including the first region of interest and the at least one additional region of interest using the first dataset and the at least one additional dataset together with the identified 3D point locations.

Generating the location map may further involve associating the determined dimensional attributes of the fragmented material portions with the respective regions of interest.

The method may involve receiving a change to at least one of the region of interest and the identified image features and determining updated dimensional attributes of the fragmented material portions.

In accordance with another disclosed aspect there is provided an apparatus for performing a fragmentation assessment of a material including fragmented material portions. The apparatus includes an image sensor for receiving two-dimensional image data representing a region of interest of the material, a three dimensional sensor for receiving a plurality of 3D point locations on surfaces of the fragmented material portions within the region of interest. The apparatus also includes a processor circuit operably configured to process the 2D image data to identify features of the fragmented material portions, identify 3D point locations within the plurality of three dimensional point locations that correspond to identified features in the 2D image, and use the identified corresponding 3D point locations to determine dimensional attributes of the fragmented material portions.

The 3D sensor may be operably configured to generate a 3D point cloud of the region of interest.

The processor circuit may be operably configured to determine a distance between the 3D sensor and a reference 3D point location within the region of interest.

The processor circuit may be operably configured to determine a spatial orientation of the identified 3D point locations, process the 3D point cloud to determine slope attributes associated with the region of interest of the material, the slope attributes including at least one of a slope angle associated with the region of interest of the material, a slope height associated with the region of interest of the material, and to use the dimensional attributes of the fragmented material portions and the slope attributes to determine slope stability.

The processor circuit may be operably configured to generate a warning signal when one of the distance between the 3D sensor and a reference 3D point location within the region of interest is less than a safe working distance of the region of interest, or the determined slope stability is less than a minimum required slope stability.

The 3D sensor may include at least two 2D image sensors disposed in spaced apart relation to each other, the 2D image sensors each being operably configured to receive a 2D image representing a different perspective viewpoint of the region of interest, and the processor circuit may be operably configured to process the 2D images to determine the 3D point locations.

The 3D sensor may include a first image sensor, a second image sensor, and a third image sensor, the second image sensor being spaced apart from the first image sensor by a first fixed distance and the third image sensor being spaced apart from the first image sensor by a second fixed distance, the second fixed distance being greater than the first fixed distance, and the 3D sensor may be configured to receive the at least two 2D images by receiving a first 2D image from a first image sensor and selectively receiving a second image from one of a second image sensor and a third image sensor.

The processor circuit may be operably configured to determine a degree of disparity value between corresponding pixels in the at least two 2D images, the degree of disparity value providing an indication of a suitability of the 2D images for processing to determine the 3D point locations and may further include displaying the degree of disparity value on a display.

The processor circuit may be operably configured to process the 2D image data to identify image features by identifying 2D boundaries associated with the fragmented material portions and to identify 3D point locations by correlating 3D point locations that are located on or proximate to the identified 2D boundaries of the fragmented material portions.

The processor circuit may be operably configured to use the identified 3D point locations to determine dimensional attributes by, for each fragmented material portion, determining dimensions of the fragmented material portion based on 3D point locations that are located on or proximate to the identified 2D boundaries of the fragmented material portions.

The processor circuit may be operably configured to process the 2D image data to identify image features of the fragmented material portions by using the identified 3D point locations to identify boundaries between fragmented material portions in the 2D image data.

The apparatus may include a display for displaying at least one of the 2D image, a preview of the 2D image, a processed view of the 2D image providing an indication of fragmented material portions within the region of interest, a fragmented material portion size attribute, a fragmented material portion volume attribute, a distance between a fragmented material portion and a 3D sensor operable to generate the 3D point locations, a determined slope stability associated with the region of interest of the material, a 3D representation of an orientation of the region of interest, and a view of the 2D image superimposed on a surface of the 3D representation.

The processor circuit may be operably configured to use the identified 3D point locations to determine a scale associated with at least some of the identified image features in the 2D image data.

The processor circuit may be operably configured to use the identified 3D point locations to determine an orientation of the region of interest in the 2D image data.

The processor circuit may be operably configured to use the identified 3D point locations to determine a scale associated with identified image features by using the identified 3D point locations to determine a scale associated with each identified image feature in the 2D image data.

The processor circuit may be operably configured to use the identified 3D point locations to estimate a volume of each of the fragmented material portions.

The processor circuit may be operably configured to use the identified 3D point locations to estimate a fragment size associated with each of the fragmented material portions.

The processor circuit may be operably configured to generate a fragment size distribution based on the determined fragment size for the fragmented material portions within the region of interest.

The processor circuit may be operably configured to convert the fragment size distribution into a corresponding sieve analysis result.

The apparatus may include a position sensor operable to determine a position of the apparatus in a geodetic coordinate system.

The position sensor may include a global positioning system (GPS) receiver.

The apparatus may include an orientation sensor operable to determine a spatial orientation of the apparatus and the processor circuit may be operably configured to determine the location of the identified 3D point locations by determining the location of the identified 3D point locations with respect to the apparatus.

The orientation sensor may include at least one of a magnetic field sensor, accelerometer, and a gyroscope.

The 2D image data and the plurality of 3D point locations may include a first dataset and the processor circuit may be further operably configured to receive at least one additional dataset including 2D image data representing the region of interest of the material and an associated plurality of 3D point locations within the region of interest, and determine dimensional attributes by using identified 3D point locations from each of the first dataset and at least one additional dataset to determine the dimensional attributes of the fragmented material portions.

The first dataset and the at least one additional dataset may be acquired from different perspective viewpoints.

The processor circuit may be operably configured to use the identified 3D point locations in the first dataset and the at least one additional dataset to estimate an overall volume of a stockpile of fragmented material portions.

The 2D image data and the plurality of 3D point locations may include a first dataset and the processor circuit may be further operably configured to receive at least one additional dataset including 2D image data representing at least one additional region of interest and an associated plurality of 3D point locations within the additional region of interest, use identified 3D point locations to determine dimensional attributes within each of the first region of interest and the additional region of interest, and generate a location map including the first region of interest and the at least one additional region of interest using the first dataset and the at least one additional dataset together with the identified 3D point locations.

The processor circuit may be operably configured to generate the location map by associating the determined dimensional attributes of the fragmented material portions with the respective regions of interest.

The processor circuit may be located on a cloud server in communication with the image sensor and the three dimensional sensor for receiving the 2D image and the plurality of 3D point locations.

In accordance with another disclosed aspect there is provided a method for measuring an object. The method involves receiving two-dimensional image data representing an object, processing the 2D image data to identify features of the object, receiving a plurality of three dimensional point locations on surfaces of the object, identifying 3D point locations within the plurality of three dimensional point locations that correspond to identified features in the 2D image, and using the identified corresponding 3D point locations to determine dimensional attributes of the identified features object.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
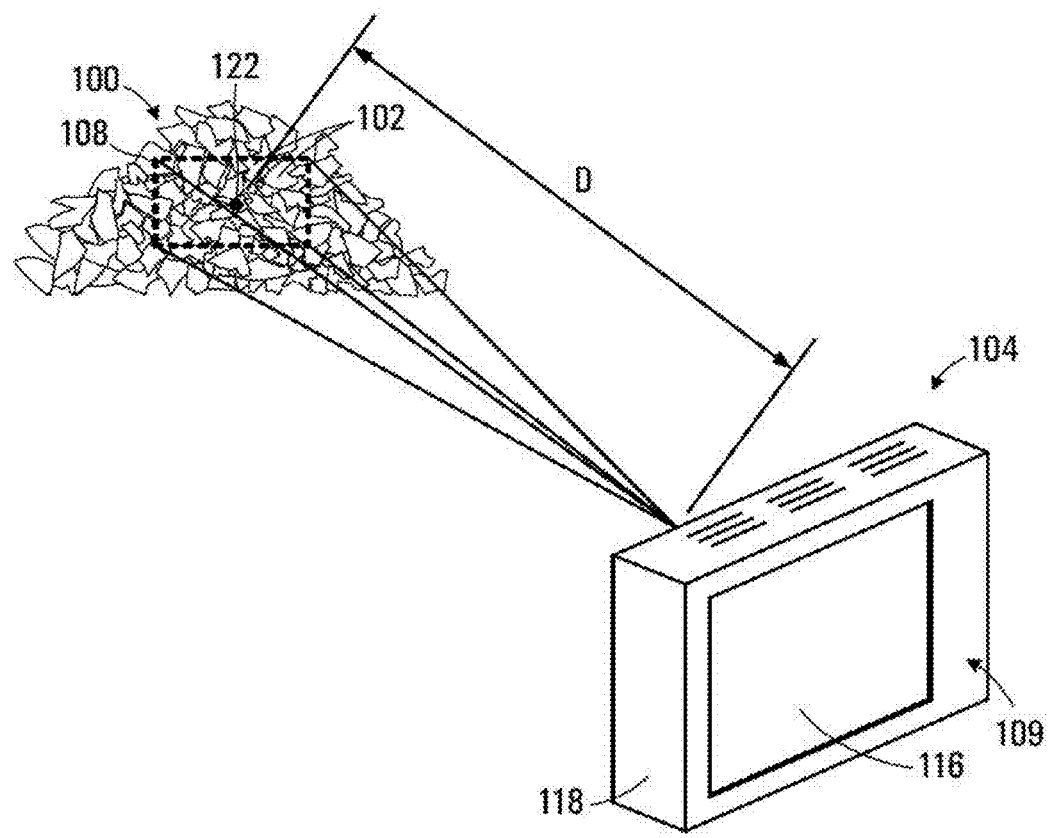
FIG. 1 is a rear perspective view of an apparatus for performing a fragmentation assessment of a material including fragmented material portions.
Figure 2:
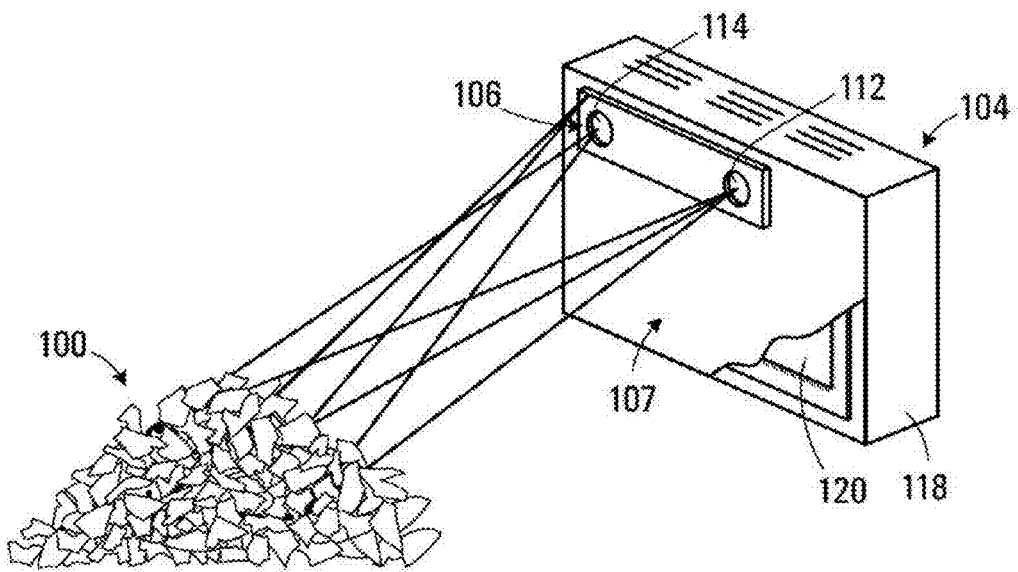
FIG. 2 is a front perspective view of the apparatus of FIG. 1.

Referring to FIG. 1 and FIG. 2, an apparatus for performing a fragmentation assessment of a material 100 including fragmented material portions 102 is shown generally at 104. In one embodiment the material 100 may include fragmented rocks, such as may be produced in a mining operation by crushing, blasting or other mining process, or operations such as quarrying or construction. In other embodiments the material 100 may be other fragmented materials, such as wood chips, a natural or synthetic construction aggregate, or any other material comprising separate particles.

The apparatus 104 includes an image sensor 106 on a front surface 107 of the apparatus for receiving two-dimensional (2D) image data representing a region of interest 108 of the material 100. In the embodiment shown the image sensor 106 includes respective first and second 2D image sensors 112 and 114 and either the first or the second image sensor can act as the image sensor 106 for receiving 2D image data. In one embodiment the region of interest 108 is selected by the user by framing the desired portion of the material 100 such that a 2D image of only the region of interest 108 is captured. In other embodiments the region of interest 108 may be defined through user input after the 2D image has been captured.

The apparatus 104 also includes a three dimensional (3D) sensor for receiving a plurality of 3D point locations on surfaces of the fragmented material portions 102 within the region of interest 108. In the embodiment shown the image sensors 112 and 114 of the image sensor 106 are disposed in spaced apart relation to each other and function as a 3D sensor by providing stereo 2D views of the region of interest 108 from the respective image sensors that can be processed to determine 3D point locations in the region of interest 108. The distance between the first and second 2D image sensors 112 and 114 is generally referred to as the "baseline". In one embodiment the 3D sensor generates 3D point locations in the form of a point cloud data file, which includes a large plurality of point locations each defined by x, y, and z coordinates.

One example of a suitable combined image sensor and 3D sensor is the Bumblebee2 Stereo Vision camera manufactured by Point Grey Research Inc. of Richmond, BC, Canada, which has two ⅓ inch CCD image sensors (i.e. the image sensors 112 and 114) that are capable of producing images having 1024×768 pixel resolution. In other embodiments the image sensor 106 may be a range imaging camera such as a time-of-flight camera that provides both the 2D image data and 3D point location data.

Alternatively, a camera having a 2D image sensor may be combined with a laser ranging device to provide the 2D image data and 3D point location data. In other embodiments, various combinations of 2D and/or 3D sensors may be implemented to provide the 2D image data and 3D point location data.

The apparatus 104 also includes a display 116 on a rear surface 109 of the apparatus for displaying results of the fragmentation assessment. In the embodiment shown in FIG. 1, the display 116 is a touchscreen display that is further operable to act as a human interface device (HID) for receiving user input from an operator of the apparatus 104 in response to the user touching the touchscreen. In other embodiments other HID input devices such as a mouse, trackball, joystick, keyboard, or thermal pad may be implemented for receiving user input.

The image sensor 106 and display 116 are mounted within a housing 118. In this embodiment the housing 118 is sized to permit the operator to comfortably hold the apparatus in two hands while directing the front surface 107 and image sensor toward the region of interest 108 while viewing the display 116 on the rear surface 109.

Figure 3:
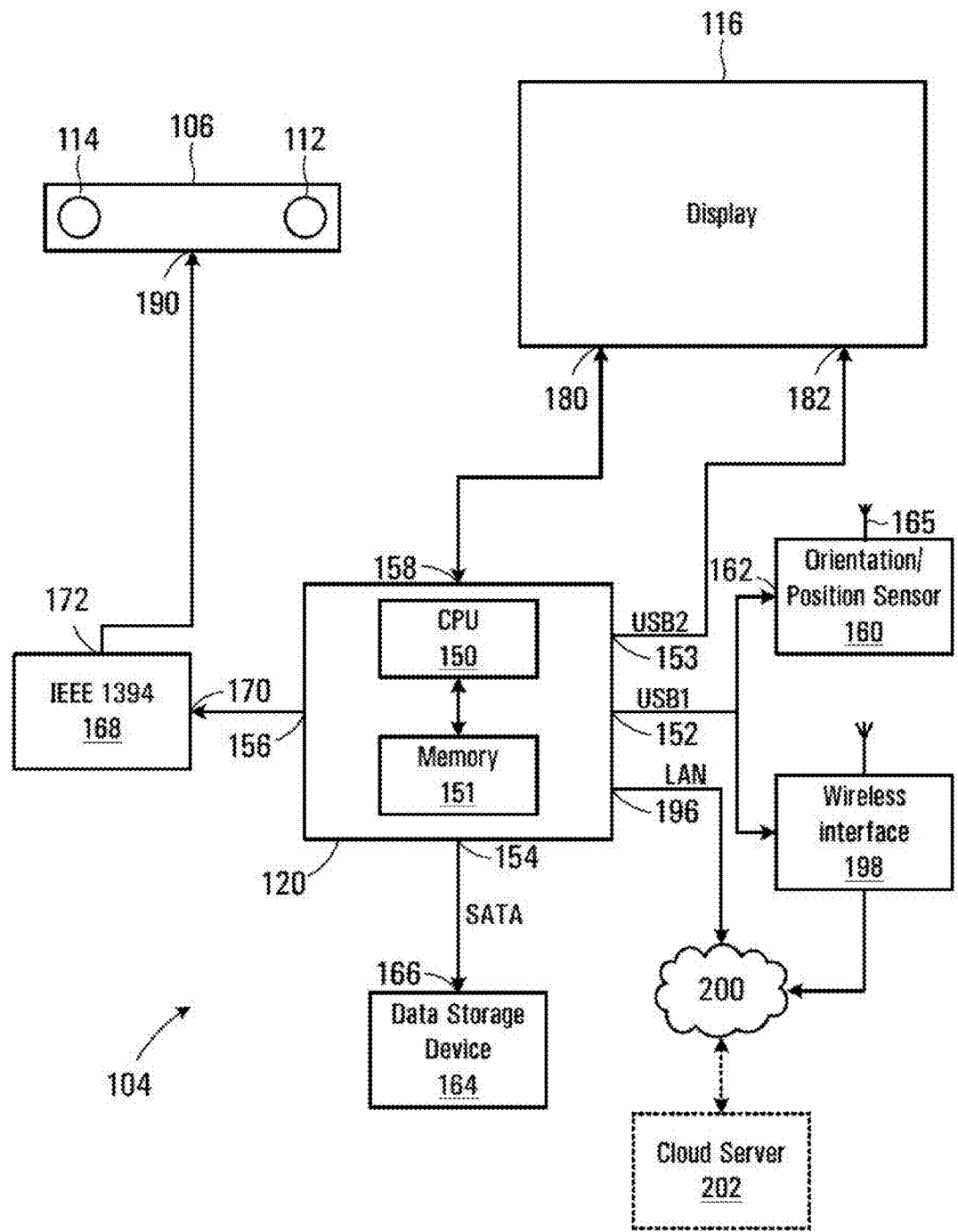
FIG. 3 is a block diagram of the apparatus shown in FIG. 1.

The apparatus 104 also includes a processor circuit 120 shown in cut-away view in FIG. 2. A block diagram of the apparatus 104 and the processor circuit 120 is shown in FIG. 3. Referring to FIG. 3, the processor circuit 120 includes a microprocessor 150 for controlling operation of the apparatus. The processor circuit 120 also includes a memory 151 in communication with the microprocessor 120 for storing program codes, image data, and other variables. The memory 151 may be implemented as a random access memory (RAM) and/or a non-volatile flash memory, or a combination thereof. The processor circuit 120 also includes input/output ports including universal serial bus (USB) ports 152 and 153, a serial ATA (SATA) port 154, a peripheral component interconnect express (PCIE) port 156, and a display port 158. The processor circuit 120 also includes an Ethernet port 196 and wireless adaptor 198 for connecting to a network 200 such as an Intranet or the Internet. The wireless adaptor 198 may be implemented using the SG901-1059B WiFi module, available from Sagrad, Inc of Melbourne, Fla., USA.

In one embodiment the processor circuit 120 is a Pico-ITX LP-172 processor board, which includes an Intel® Atom microprocessor. The Pico-ITX LP-172 processor board is available from Commell of Taipei, Taiwan. The Pico-ITX LP-172 processor board also includes on-board random access memory (RAM), display drivers, a touchscreen interface, Audio drivers, and a LAN Interface. Alternatively, the processor circuit 120 may be implemented using and Advantech MIO-5290U processor board, which includes an Intel Core i7-3516UE Processor, on-board RAM, display drivers, USB ports, LAN port, audio drivers and display drivers.

The display 116 includes a display signal input 180 for receiving a display signal from the display port 158 of the processor circuit 120. The display 116 also includes a HID port 182 for generating HID signals in response to the operator providing touch inputs at the touchscreen. The HID port 182 is in communication with the USB port 153 for providing HID signals to the processor circuit 120.

In embodiments in which the 3D sensor 110 is implemented using the Bumblebee2 stereo camera, the apparatus 104 also includes an IEEE 1394 interface 168 that has an Input/Output (I/O) port 170 in communication with the PCIE port of the processor circuit 120 and an IEEE 1394 (FireWire) port 172 that is in communication with an IEEE 1394 I/O port 190 of the image sensor 106 for receiving 2D image data from the respective first and second 2D image sensors 112 and 114.

The apparatus 104 further includes an orientation sensor 160, which has an I/O port 162 in communication with the USB port 152 of the processor circuit 120. The orientation sensor 160 may include one or more sensors for determining a spatial orientation the image sensor 106 of the apparatus 104. For example, in one embodiment the orientation sensor 160 may include orientation sensing elements such as a tri-axial accelerometer, 3D gyroscope, and a 3D magnetic field sensor (not shown) implemented using a MEMS (micro-electro-mechanical systems) device. One example of such a MEMS orientation sensor is the Xsens MTi manufactured by Xsens, An Enschede, The Netherlands. The Xsens MTi sensor includes a temperature sensor, three accelerometers respectively aligned to the X, Y, and Z axes for measuring linear accelerations (sensitive to the earth's gravitational field), three magnetometers for measuring the earth's magnetic fields to determine a cardinal direction with respect to the earth's magnetic field, and three rate gyroscopes for measuring a rate of rotation about the X, Y, and Z axes. The Xsens MTi sensor further includes signal conditioning amplifiers to condition signals produced by the various included sensors, analog to digital converters, and a dedicated digital signal processor (DSP). The DSP receives the various signals generated by the gyroscopes, magnetometers and accelerometers and uses a proprietary algorithm to process the signals, apply various corrections and calibration factors, and generate a 3D heading and attitude of the sensor. The DSP encodes the generated 3D attitude and heading into a data stream and produces a data signal output at the USB port 162. Other suitable location sensors are available from InvenSense Inc. of San Jose, Calif., USA and VectorNav Technologies, LLC of Dallas, Tex. USA.

In other embodiments, the MEMS based orientation sensor may be substituted by other sensors that provide heading and/or attitude. For example, a biaxial accelerometer may be used to produce orientation signals representing the attitude of the sensor 106, and the signals may be filtered using a low pass filter to remove high frequency variations in the signal. A compass type sensor may alternatively be used to provide a heading signal.

The orientation sensor 160 may also include a position sensor. In this embodiment the orientation sensor 160 includes a Global Positioning System (GPS) receiver 165 for determining a position of the at least one sensor in a geodetic coordinate system. The range of Xsense MTi sensors includes several sensor options that incorporate a GPS receiver together with the orientation sensor and provide a position signal that can be used to determine the position (i.e. latitude, longitude, and altitude) of the image sensor 106.

The apparatus 104 further includes a data storage device 164 for storing program codes for directing the microprocessor 150 to implement fragmentation assessment functions and for storing image data, 3D location data, and fragmentation results, for example. In one embodiment the data storage device 164 is implemented using a SATA hard drive and is in communication with the processor circuit 120 via the SATA port 154. In another embodiment the data storage device 164 may be implemented using a solid state drive, such as the InnoDisk 3ME 64 GB Solid-state drive, which has a wide temperature rating.

Operation

Figure 4:
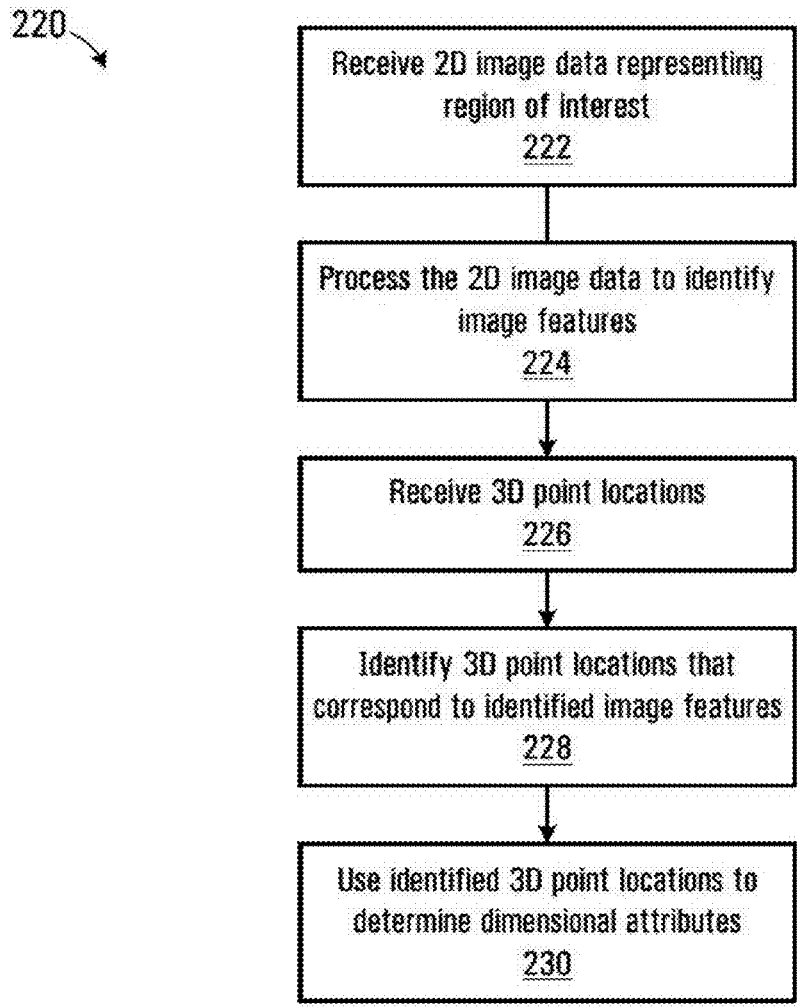
FIG. 4 is a flowchart depicting blocks of code for directing a processor circuit of the apparatus shown in FIG. 3 to perform a fragmentation assessment.

Referring to FIG. 4, a flowchart depicting blocks of code for directing the processor circuit 120 to perform a fragmentation assessment of the 100 is shown generally at 220. The blocks generally represent codes that may be read from the data storage device 164 or received at the Ethernet port 196 or wireless adaptor 198, and stored in the memory 151 for directing the microprocessor 150 to perform various functions related to performing the fragmentation assessment. The actual code to implement each block may be written in any suitable program language, such as C, C++, C#, and/or assembly code, for example.

The process 220 begins at block 222, which directs the microprocessor 150 to receive 2D image data representing the region of interest 108 of the material 100. Referring back to FIG. 3, the microprocessor 150 issues commands to the image sensor 106 via the IEEE 1394 interface 168 to capture a 2D image of the region of interest 108 and the resulting 2D image data is captured by both of the first and second 2D image sensors 112 and 114 and loaded into the memory 151 and/or saved to the data storage device 164.

Block 224 then directs the microprocessor 150 to process the captured 2D image data to identify image features of the fragmented material portions. Either one of the resulting digital 2D images produced by the respective sensors 112 and 114 may be designated as a reference image and used for this purpose. In the remainder of this description the first image sensor 112 is taken as the sensor that produces the reference 2D image while the 2D image produced by the second image sensor 114 is used in combination with the image produced by the first image sensor to generate the 3D point locations. The identification of image features may involve executing a fragmentation analysis process on the reference 2D image as described later with reference to FIG. 6. Generally, prominent image features in the reference 2D image will selected and identified by saving pixel locations that correspond to the identified features in the memory 151.

Having identified pixel locations of image features in the reference 2D image, at this point dimensions of these features could also be determined in pixels. However further information is required to determine a scale for computing real-world dimensions of the actual features represented in the 2D image. The determined scale should correct for various alignments of the region of interest 108 and the image sensor 106. For example, the region of interest 108 may be sloped or curved and the image sensor 106 may also not be oriented parallel to the region of interest 108, resulting in the size of some fragments being magnified and the size of other fragments being understated in the 2D image. The further steps in the process 220 address this requirement for further scaling information.

Figure 5:
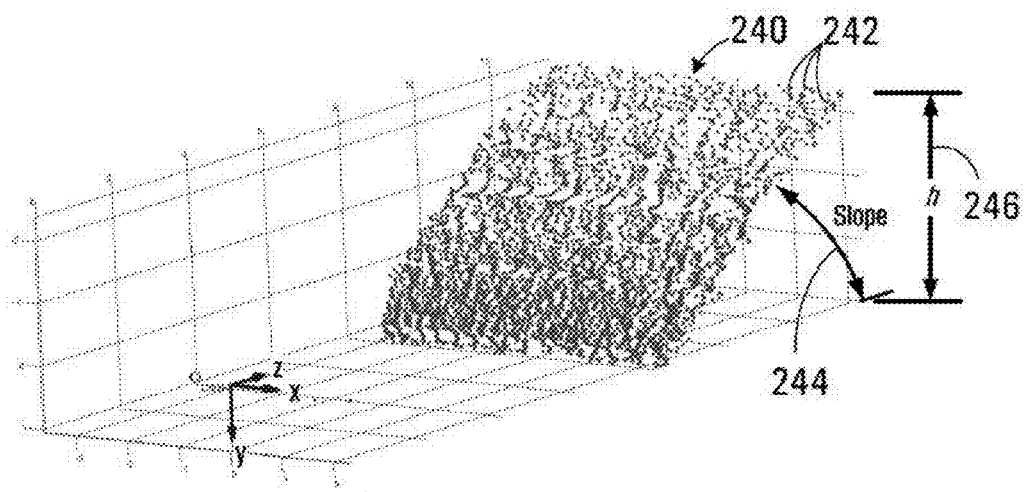
FIG. 5 is a 3D representation of a point cloud generated by the apparatus shown in FIG. 3.

The process 220 then continues at block 226, which directs the microprocessor 150 to receive 3D point locations on surfaces of the fragmented material portions 102 within the region of interest 108. In this embodiment, since 2D image data would have already been captured by each of the sensors 112 and 114 and saved in the memory 151, block 151 directs the microprocessor 150 to execute correlation algorithms to determine 3D point locations from the two 2D images. In this description, the first 2D image sensor 112 is designated as the reference image sensor and the point cloud of 3D point locations is thus referenced to pixel location within the 2D image produced by this reference image sensor. The 3D point location may be expressed as x, y, and z coordinates with the location of the first sensor 112 acting as an origin for the coordinate system. Referring to FIG. 5, an example of a point cloud is shown generally at 240. The point cloud 240 includes a plurality of 3D point locations 242 plotted on x, y, and z axes.

Block 226 also directs the microprocessor 150 to save the x, y, and z coordinates for each point location in the memory 151. For the Bumblebee2 stereo camera, the supplier provides a software library including blocks of code that can be loaded from the data storage device 164 into memory 151 for directing the microprocessor 150 to process the 2D images to generate a dense point cloud including 3D point locations within the region of interest 108.

The process 220 then continues at block 228, which directs the microprocessor 150 to identify 3D point locations within the point cloud data that correspond to the image features in the reference 2D image that were identified at block 224. Since the 3D coordinates x, y, and z of 3D point locations for pixels in the reference 2D image have already been determined at block 226, block 228 directs the microprocessor 150 to read the coordinates for each identified boundary pixel in the reference 2D image, thus providing 3D point locations on the boundary of each fragmented material portion.

The process then continues at block 230, which directs the microprocessor 150 to use the identified corresponding 3D point locations to determine dimensional attributes of the fragmented material portions 102. In one embodiment the corresponding 3D point locations lie on a boundary of the fragmented material portion and block 230 directs the microprocessor 150 to use the x, y, and z coordinates to calculate dimensions of the fragmented material portion. The method relies on the boundaries of the fragment portions determined in accordance with the block 224 and the process 280 shown in FIG. 7, which results in segmentation of fragmented portions to determine boundary pixels in the reference 2D image and corresponding 3D point coordinates x, y, and z for boundary pixels. The x and y coordinates are then used to fit an ellipse to the boundary points. To express the fragmentation analysis result in a sieve analysis result format, the block 224 directs the microprocessor 150 to determine the smallest square that the ellipse would fit into, which provides an estimate of a passing sieve size for the particle. Block 230 then directs the microprocessor 150 to save the size and/or sieve size for each fragmented portion in the memory 151.

In another embodiment, determining dimensional attributes of the fragmented material portions may involve generating a volume estimate for each fragmented portion. In this embodiment, block 230 further directs the microprocessor 150 to calculate an area of the ellipse, which is used as the volume estimate. Alternatively, block 230 may directs the microprocessor 150 to fit an ellipsoid to the x, y, and z point locations on the boundary and the volume of the ellipsoid may be used as the volume and/or size estimate.

Other alternatives involve calculating a single scaling factor (cm/pixel) based on average z values for each particle and then performing size and volume estimates in pixels, with a subsequent multiplication by the scaling factor to determine real-world dimensions. Alternatively, a known shape (e.g., a plane) may be fitted to the 3D point cloud and a fixed or varying scaling factor for the region of interest 108 may be determined for calculating the dimensional attributes.

In one embodiment, receiving the 2D images at block 222 of the process 220 may further include a process for providing an indication of a suitability of the 2D images for subsequent processing to determine the 3D point locations. In this embodiment, block 222 directs the microprocessor 150 to determine a degree of disparity value between corresponding pixels in the 2D images. For each pixel in the region of interest 108 a disparity or difference, in pixels, between a location of a point in the first and second images captured by the first image sensor 112 and second image sensor 114 is determined. A percentage is calculated for pixels that have a disparity between the two images relative to the total pixels in the region of interest 108 and is used as a degree of disparity. The calculated degree of disparity value may be displayed on the display 116 while the operator is in the process of capturing an image of the material 100 to facilitate capture of suitable images for further processing. If the degree of disparity value is below a threshold, the apparatus 104 may generate a warning, such as a warning on the display to prompt the operator to attempt to obtain a more suitable image for processing.

In other embodiments, the process 220 shown in FIG. 4 may be implemented in part on the apparatus 104 and captured data may be uploaded via the Ethernet port 196 or wireless adaptor 198 to a cloud server 202 via the network 200. For example, 2D data captured at block 222 and 3D point locations received at block 226 may be uploaded to the cloud server 202 for further processing. The functions of blocks 224, 228, and/or 230, which are more processor intensive, may be performed by the cloud server 202. This would permit the apparatus 104 to have a less powerful processor circuit 120 since processing intensive tasks would be offloaded to the cloud server 202. The dimensional attributes provided by block 230 could then be downloaded to the apparatus 104, published as a web page, or otherwise viewed on the apparatus 104 or a separate platform in communication with the cloud server 202.

Identifying Image Features

Figure 6:
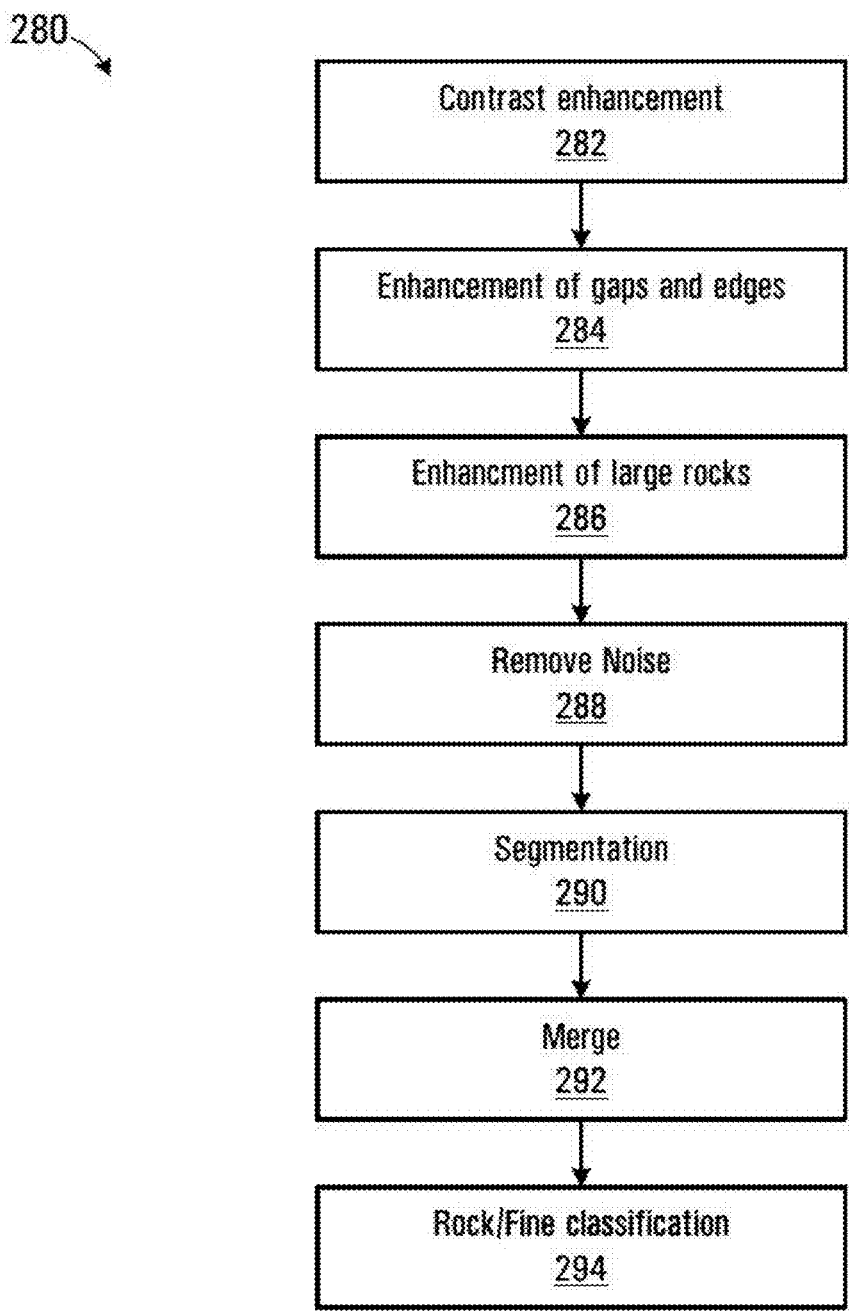
FIG. 6 is a flowchart depicting blocks of code for directing a processor circuit of the apparatus shown in FIG. 3 to perform a portion of the fragmentation assessment process shown in FIG. 4.

In one embodiment block 224 of the process 220 is implemented by identifying image features by performing a fragmentation analysis on the 2D image data. An example of a fragmentation analysis process for a mined rock material is shown in FIG. 6 at 280, where the fragmented portions comprise rocks of differing size along with some fine particles. The process 280 begins at block 282, which directs the microprocessor 150 to perform a contrast enhancement of the reference 2D image. In one embodiment this involves equalizing the brightness of the reference 2D image, and non-linearly increasing the contrast in dark areas and decreasing the contrast in bright areas of the image. Dark areas may typically correspond to gaps between rocks, which are important areas for determination of rock boundaries while bright areas of the image may correspond to rock surfaces or fines. In one embodiment a contrast limited adaptive histogram equalization (CLAHE) algorithm is employed to perform the contrast enhancement.

The process then continues at block 284, which directs the microprocessor 150 to perform an enhancement to darken gaps and edges. In one embodiment this involves applying a bottom hat transform function to highlight the edges followed by application of a close function to connect edges and eliminate unconnected segments and then subtracting the bottom hat from the image to make gaps dark.

The process then continues at block 286, which directs the microprocessor 150 to perform an enhancement of large rocks in the image. In one embodiment this may involve the following image processing steps:

Eroding to remove small regions
Dilating to recover large regions
Thresholding to obtain a mask of large regions
Closing small holes within large regions
Masking large region details in the image
Removing small peaks
Smoothing surface textures
Removing small pits
Extracting smoothed large regions
Closing holes that exist within large regions
Bringing back absolute strong edges from the image if they have been accidentally closed
Applying a Euclidean distance map to large regions
Stretching the intensity to range over a full intensity range
Applying a histogram equalized Euclidean distance map image to large rock regions on analysis image.

The process then continues at block 288, which directs the microprocessor 150 to remove noise by eliminating small artifacts, which are more likely to be noise than small rocks. Block 290 then directs the microprocessor 150 to perform segmentation to partition the image into multiple segments or sets of pixels representing the fragmented rocks. In one embodiment a watershed segmentation algorithm is applied to the image. The segmentation results in determination of boundaries of fragmented material portions 102 the material 100.

Block 292 then directs the microprocessor 150 to optionally perform a merge function to merge over-segmented regions, which involves processing the segmented portions to merge previously segmented portions that are more likely belong to the fragmented material portion 102.

Block 294 then directs the microprocessor 150 to classify each segmented region as a rock fragment or a region of fines, which are defined as particles smaller than the smallest detectable size. The estimation of the volume of fines is important for accurately generating a size distribution, as described later herein.

The process 280 thus results in a plurality of segmented rock fragments being identified by pixel locations of the boundaries or edges of the rocks in the reference 2D image.

Display

Figure 7:
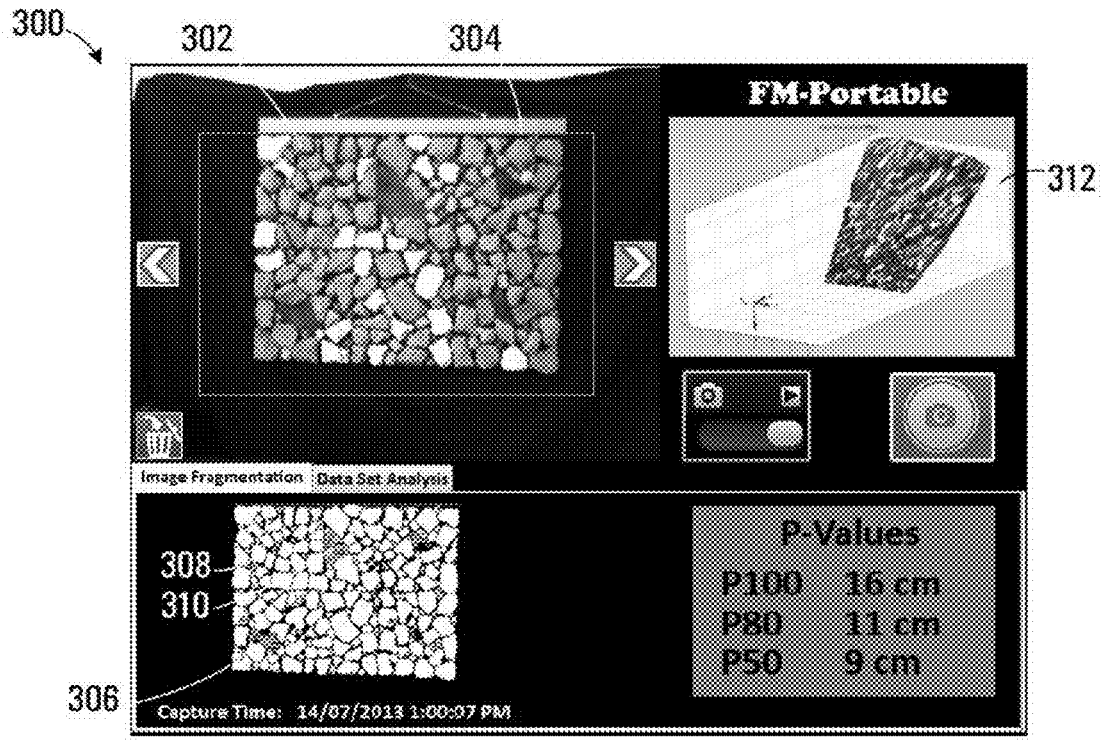
FIG. 7 is a screenshot including an example of a fragmentation assessment result produced by the apparatus shown in FIG. 3.

A screenshot showing an example of a fragmentation assessment result displayed on the display 116 is shown in FIG. 7 at 300. The captured reference 2D image is shown at 302 with the region of interest 108 indicated by the box 304. Prior to capture, a preview of the 2D image may be displayed to enable the operator to interactively position the apparatus 104 to capture a desired region of interest. A processed view of the 2D image providing an indication of fragmented material portions within the region of interest is shown at 306. In the image 306, fragment portions 308 are shaded white, while regions of fines 310 are hatched. A view showing an orientation of the region of interest 108 is provided at 312. The view 312 is shown with respect to the 3D coordinate system of reference image sensor 112 and a 2D image of the region of interest 108 is superimposed on the view to indicate the slope and orientation of the region of interest.

Figure 8:
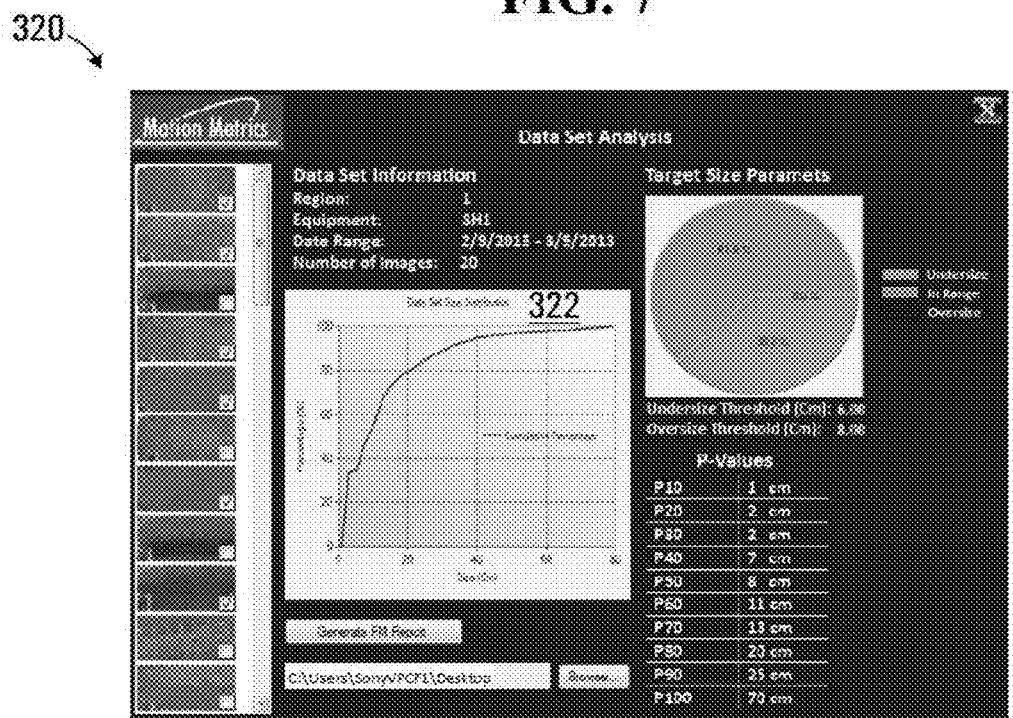
FIG. 8 is a further screenshot including an example of a fragmentation assessment result produced by the apparatus shown in FIG. 3.

A further screenshot showing an example of a sieve analysis result based on the fragmentation assessment displayed on the display 116 is shown in FIG. 8 at 320. The dimensions for the plurality of fragmented material portions that have been identified in the fragmentation assessment are used to provide a sieve analysis estimate. The sieve analysis estimate presents the fragmentation in a format that is familiar to persons wishing to assess fragment size distribution. The result may be presented in graphical form as shown at 322, where fragmented portion size is plotted on the x-axis and percentage on the y-axis. Alternatively, the result may be presented as shown at 324 as a table of P-value proportions (P10-P100), where the size dimension represents the maximum size of the particles for each of the proportions. For example, in the example shown, 100% of the fragment portions are smaller than 70 cm or would pass through a 70 cm sieve and 90% of the fragment portions would pass through a 25 cm sieve.

Estimating Distance to Fragmented Material Portions

Referring back to FIG. 1, in one embodiment the apparatus 104 may determine a distance D between the image sensor 106 and a reference 3D point location 122 within the region of interest 108. As disclosed above, the location of the first sensor 112 may act as an origin for the coordinate system, in which case the z coordinate of each 3D point location acquired at block 226 of the process 220 corresponds to the distance between the first sensor 112 and the location on the material 100. In one embodiment the reference 3D point location may be taken as a central location within the region of interest 108 such as the point location 122. Alternatively, the reference 3D point location may be located on any of the fragmented material portions 102, or the operator may select a particular fragmented material portion as the reference. The distance D may be displayed to the operator on the display 116.

Figure 13:
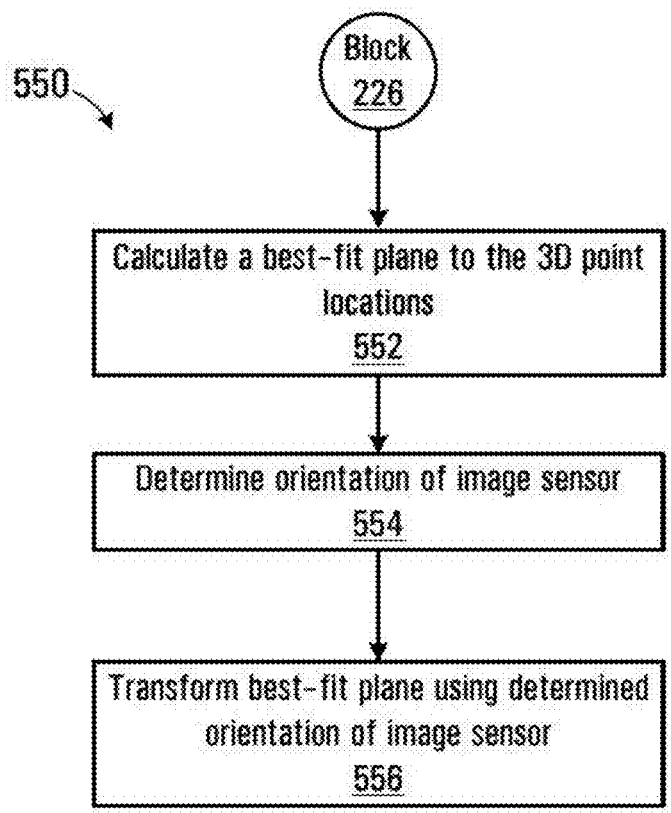
FIG. 13 is a flowchart depicting blocks of code for directing a processor circuit of the apparatus shown in FIG. 3 to determine an orientation of a best-fit plane of a slope.

In some embodiments, the apparatus 104 may be further configured to compare the distance D against a safe working distance for the region of interest and display or annunciate a warning, such as an audible warning tone, if the operator attempts to capture an image at a location that is closer than the safe working distance. For example, the coordinates of the 3D point locations in the region of interest acquired at block 226 of the process 220 provide sufficient information for processing by the processor circuit 120 to determine slope attributes associated with the region of interest 108 of the material 100. Referring back to FIG. 5, the region of interest 108 in the point cloud 240 has a slope angle 244 and a height 246. However, since the apparatus 104 may not be held parallel to the slope, the slope angle may be distorted. Referring to FIG. 13, a process for estimating actual slope angles and/or height is shown at 550. At block 552 the microprocessor 150 is directed to receive the 3D point location data from block 226 of the process 220 (shown in FIG. 4) and to calculate a best-fit plane to the 3D point locations with respect to the apparatus 104. The best-fit plane is thus correctly oriented with respect to the apparatus 104. Block 554 then directs the microprocessor 150 to determine the spatial orientation of the image sensor 106 of the apparatus 104 by reading the orientation sensor 160. The orientation sensor 160 provides the spatial orientation of the apparatus 104 with respect to the gravitational field of the earth. Block 556 then directs the microprocessor 150 to transform the best fit plane into a world coordinate system using the spatial orientation of the apparatus 104.

The processor circuit 120 is thus configured to fit a plane to the 3D point locations 242 and then determine the slope angle 244 and height 246 of the plane, for example. In general, the safe working distance from a sloped material is determined as a function of the fragment or rock size of the material 100, the slope height h, and the slope angle. Various formulas may be applied by the processor circuit 120 to calculate metrics such as a slope stability value and/or a safe working distance based on these parameters. The calculated metrics may be displayed on the display 116 and compared against the actual distance or minimum required slope stability. The processor circuit 120 may also be configured to display or annunciate a warning when the actual distance is less than the safe working distance. The measurement of safe working distance and slope stability is applicable in not only the mining industry but also in the other industries such as the construction industry, where a slope assessment may be required during the construction of roads, for example. The apparatus 104 advantageously provides the information necessary for determination of slope stability and safe working distance. i.e. the size of fragments, slope angle, and distance to the slope.

Figure 9:
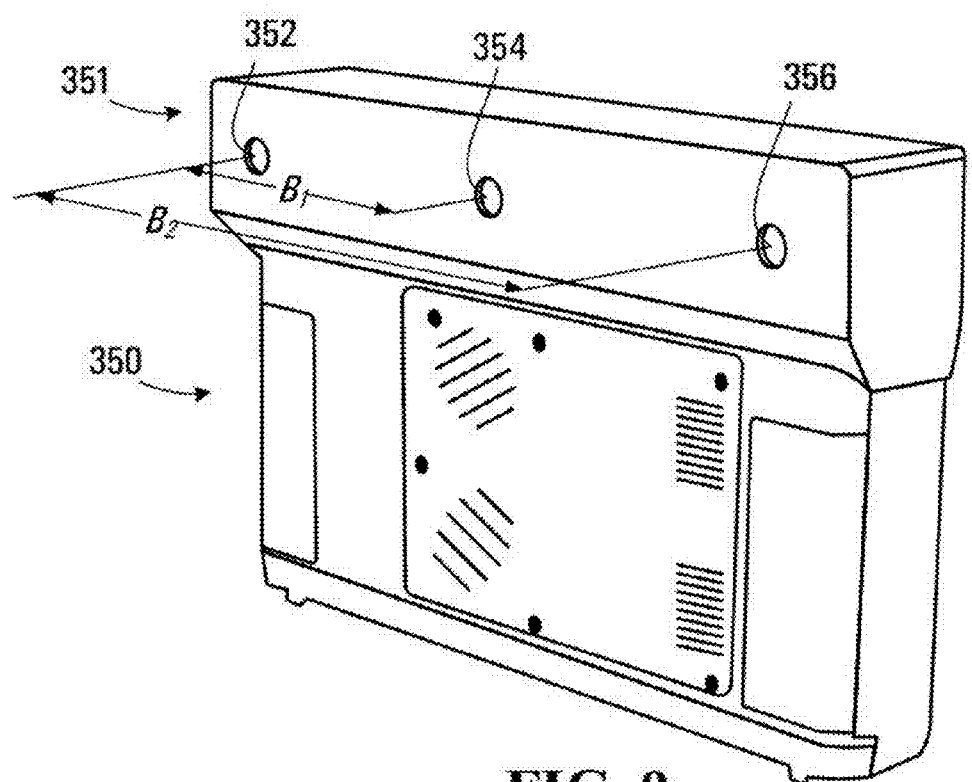
FIG. 9 is an alternative embodiment of an image sensor used in the apparatus shown in FIG. 1.

An alternative embodiment of the apparatus is shown in FIG. 9 at 350. Referring to FIG. 9, the apparatus 350 includes an image sensor 351 having a first image sensor 352, a second image sensor 354, and a third image sensor 356. The second image sensor 354 is spaced apart from the first image sensor 352 by a first fixed distance $B_1$. The third image sensor 356 is spaced apart from the first image sensor 352 by a second fixed distance $B_2$, which is greater than the first fixed distance $B_1$. When generating the 3D point cloud 240 shown in FIG. 5, an accuracy associated with the 3D point location determination is dependent at least in part on the distance or baseline between the sensors. For example, for a $B_1$ distance of 12 cm between the first image sensor 352 and the second image sensor 354, it was found that the accuracy was in the region of 13 cm. If it is desired to increase the accuracy in the z-axis direction, the first image sensor 352 and third image sensor 356 having the greater $B_2$ distance between sensors may be selected. In general, the greater $B_2$ distance between sensors will increase z-axis accuracy, but reduces the ability to estimate z values for close up fragmented materials. The first image sensor 352 and second image sensor 354 spaced by the distance $B_1$ may thus be selected for capturing images when the fragmented materials are closer to the apparatus 104. A suitable sensor for implementing the image sensor 351 is the Bumblebee XB3 available from Point Grey Research Inc of Richmond, BC, Canada. In other embodiments the sensor 106 shown in FIG. 1 may be configured such that one of the sensors 114 or 112 is moveable to provide for an adjustable baseline.

Orientation and Position

Referring back to FIG. 5, an orientation of the point cloud 240 is shown in the coordinate system of the image sensor 106. In embodiments where the apparatus 104 includes the orientation sensor 160, the processor circuit 120 may query the orientation sensor to obtain orientation information. For example, when the images are captured, the apparatus 104 is not held parallel to the region of interest 108 of the material 100 the point cloud will not be represented at a correct real-world orientation. In one embodiment the processor circuit 120 may include functionality for performing a transform to cause the point cloud 240 to be represented in the real-world orientation using attitude and heading information provided by the orientation sensor 160. The transformed region of interest 108 would then appear at a corrected real-world orientation.

In yet a further embodiment where the image sensor 106 includes a GPS receiver 165, the processor circuit 120 may query the GPS receiver to obtain real-world coordinates of the camera, which facilitates determination of the orientation and position of the region of interest 108 in real-world coordinates referenced to a geodetic coordinate system. The GPS receiver 165 thus provides the actual position of the sensor, while the other sensors in the orientation sensor 160 provide the heading and attitude of the apparatus 104 at the position.

Multiple Datasets

In another embodiment more than one image capture may be processed to generate the fragmentation assessment, thus providing averaging over a plurality of image captures. In this embodiment, the first image a capture including the 2D image data and the plurality of 3D point locations may be initiated to receive a first dataset of the region of interest 108 followed by a second image capture to receive at least one additional dataset including 2D image data and an associated plurality of 3D point locations within the region of interest. The processor circuit 120 includes functionality for determining the dimensional attributes by using identified 3D point locations from each of the first dataset and at least one additional dataset to determine the dimensional attributes of the fragmented material portions 102 of the material 100. For example, the processor circuit 120 may generate a volume vs. size histogram for each dataset for each size, where the sum of volumes of all particles with that size is plotted in the histogram. A similar histogram may also be generated for the additional dataset or datasets, which may be combined by element-wise addition of the respective size histograms. The fragmentation assessment result is then generated by using the combined size histogram to generate a cumulative size distribution and other parameters such as the fragment distribution P-Values. Advantageously, if the multiple datasets are captured from differing perspective viewpoints, the resulting fragmentation assessment will tend to average out errors due to processing that may occur when segmenting or identifying boundaries.

Figure 10:
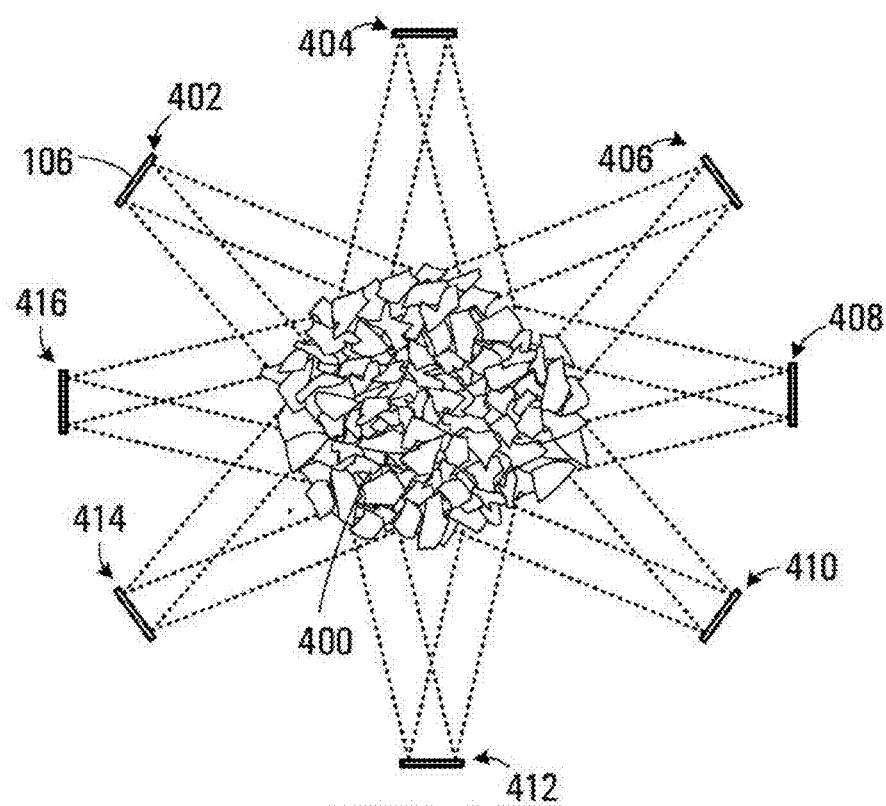
FIG. 10 is a top view of a fragmented material.

Referring to FIG. 10, in another embodiment the apparatus 104 may be used to estimate a volume of a stockpile of fragmented material portions. A fragmented material stockpile is shown in top view at 400. The stockpile 400 may be produced by a mining, quarrying, and/or blasting operation. In this embodiment multiple datasets are obtained by moving the image sensor 106 between a plurality of positions 402-416 around the stockpile 400 to obtain datasets from each of a plurality of overlapping perspective viewpoints. At each of the plurality of positions 402-416 the processor circuit 120 of the apparatus 104 stores the orientation provided by the orientation sensor 160 and the position provided by the GPS receiver 165. The processor circuit 120 then uses the recorded positions and orientations to transform each of the resulting captured images into a common coordinate system, thus combining the multiple datasets. The resulting dataset is then processed to remove overlapping areas resulting in a plurality of 3D points representing the stockpile 400. The plurality of 3D points thus enclose the stockpile 400 and define the extents of a stockpile volume, which may be calculated by the processor circuit 120.

Location Map

Figure 11:
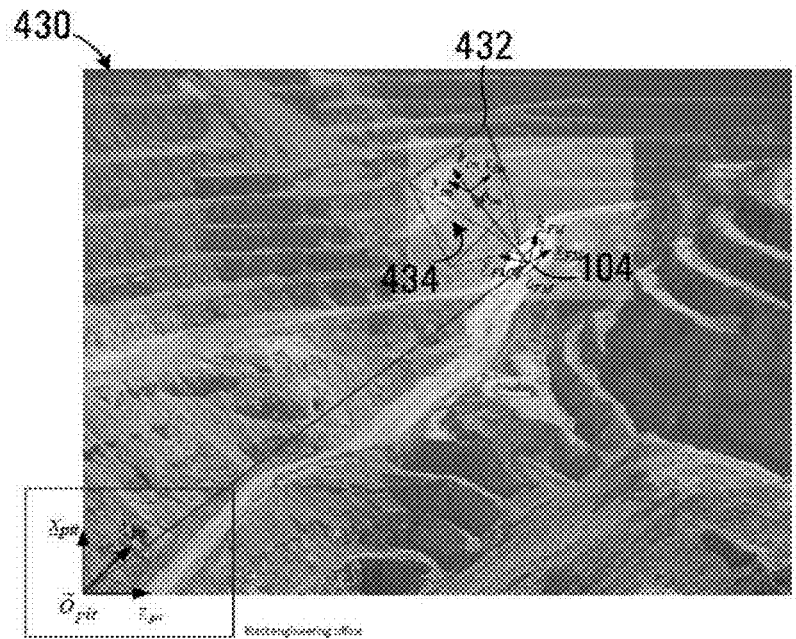
FIG. 11 is a view of a mine with the apparatus of FIG. 1 positioned at for capturing an image of a region of interest of a mine face.
Figure 12:
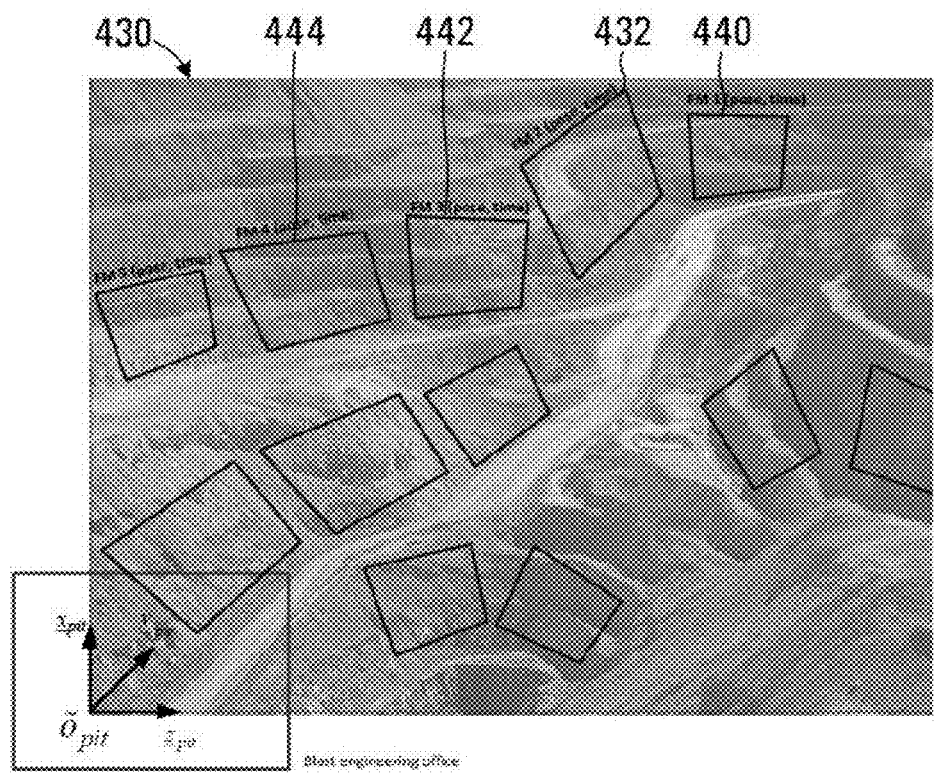
FIG. 12 is a view of a location map in accordance with another embodiment of the invention.

Referring to FIG. 11, a view of a mine is shown generally at 430 and the apparatus 104 is shown positioned at an origin point $O_{FM}$ for capturing an image of a first region of interest 432 of a mine face 434. In this embodiment the apparatus 104 includes the orientation sensor 160 and GPS receiver 165 and is able to position and orient the region of interest 432 with respect to a real-world coordinate system as described above. In this embodiment, an origin of the real-world coordinate system is taken as a blast engineering office location designated at the origin point $O_{pit}$. The first region of interest 432 may thus be referenced by coordinates with respect to the coordinate system $x_{pit}$, $y_{pit}$, $z_{pit}$. Referring to FIG. 12, over time further images may be captured at regions of interest 440, 442, and 446 for example, and may also be referenced by coordinates with respect to the coordinate system $x_{pit}$, $y_{pit}$, $z_{pit}$ thus generating a location map. Each region of interest within the map has an associated fragmentation assessment thus providing a record of fragmentation over multiple regions of interest.

Alternatively, subsequent images may be captured over time for the first region of interest and the subsequent images provide a record of the region of interest as operations proceed. The subsequent images provide information that may be useful in predicting or detecting shifts in the region over time as operations proceed, providing useful data for monitoring the condition of the region. As another example, images may be captured before and after blasting and may be processed to show changes due to the blasting operation, such as a slop change or change to an upper edge of the slope.

In another embodiment, the apparatus 104 may be used to evaluate the condition of haul roads, ensuring that the slope and the surface of the roads remain within safe operating limits.

In another embodiment, the image features selected at block 224 may be associated with rock seams between bodies of ore and the apparatus 104 may be configured to produce dimensional attributes of the rock seams in the material 100.

Other Embodiments

The apparatus 104 shown in FIGS. 1-3 is an integrated device having image sensor 106, orientation sensor 160, processor circuit 120 and display 116 integrated within a common housing 118. In other embodiments the components of the apparatus 104 may be physically separated and connected to each other by a cable or wireless interface. For example, in one embodiment the processor circuit may be provided in the form of a tablet computer, which commonly include a display, and in many cases orientation sensors and a GPS receiver. The image sensor may be provided as a separate unit that interfaces with the tablet computer to upload captured image data to the tablet computer for processing and display.

In some embodiments the captured 2D images and/or 3D point locations may be reprocessed under different conditions to generate a new result. For example, the region of interest 108 may be modified by the operator to select a smaller or larger area of the material 100 and a new determination of the dimensional attributes may be performed under the changed conditions.

In the above disclosed embodiments, fragmentation analysis of 2D image data for a region of interest of a material is combined with 3D location data to provide fragmentation assessments of the material. The fragmentation assessment proceeds on the basis of the 2D image data, with 3D location data being used to provide an accurate scaling of the fragmented material portions. Since the image processing necessary to identify image features or boundaries of the material fragments is done in 2D, the computational complexity is reduced over a system that does image processing in 3D, which is much more computationally intensive. The disclosed apparatus 104 may thus be implemented in a small portable device while still providing a responsive fragmentation assessment.

While specific embodiments of the invention have been described and illustrated, such embodiments should be considered illustrative of the invention only and not as limiting the invention as construed in accordance with the accompanying claims.

What is claimed is:

1. A method for performing a fragmentation assessment of a material including fragmented material portions, the method comprising:
   receiving two-dimensional (2D) image data representing a region of interest of the material;
   processing the 2D image data to identify features of the fragmented material portions;
   receiving a plurality of three dimensional (3D) point locations on surfaces of the fragmented material portions within the region of interest;
   identifying 3D point locations within the plurality of three dimensional (3D) point locations that correspond to identified features in the 2D image; and
   using the identified corresponding 3D point locations to determine dimensional attributes of the fragmented material portions.

2. The method of claim 1 wherein receiving the plurality of 3D point locations comprises receiving 3D point locations from a 3D sensor operable to generate a 3D point cloud of the region of interest.

3. The method of claim 2 further comprising determining a distance between the 3D sensor and a reference 3D point location within the region of interest.

4. The method of claim 2 further comprising:
   determining a spatial orientation of the identified 3D point locations;
   processing the 3D point cloud to determine slope attributes associated with the region of interest of the material, the slope attributes comprising at least one of:
      a slope angle associated with the region of interest of the material; and
      a slope height associated with the region of interest of the material;
   using the dimensional attributes of the fragmented material portions and the slope attributes to determine slope stability.

5. The method of claim 4 further comprising generating a warning signal when one of:
   the distance between the 3D sensor and a reference 3D point location within the region of interest is less than a safe working distance of the region of interest; or
   the determined slope stability is less than a minimum required slope stability.

6. The method of claim 1 wherein receiving the plurality of 3D point locations comprises receiving a first 2D image from a first image sensor and selectively receiving a second image from one of a second image sensor and a third image sensor, the second image sensor being spaced apart from the first image sensor by a first fixed distance and the third image sensor being spaced apart from the first image sensor by a second fixed distance, the second fixed distance being greater than the first fixed distance and further comprising processing the two 2D images to determine the 3D point locations.

7. The method of claim 6 further comprising determining a degree of disparity value between corresponding pixels in two 2D images, the degree of disparity value providing an indication of a suitability of the 2D images for processing to determine the 3D point locations and further comprising displaying the degree of disparity value on a display.

8. The method of claim 1 wherein processing the 2D image data to identify image features comprises identifying 2D boundaries associated with the fragmented material portions and wherein identifying 3D point locations comprises correlating 3D point locations that are located on or proximate to the identified 2D boundaries of the fragmented material portions.

9. The method of claim 8 wherein using the identified 3D point locations to determine dimensional attributes comprises, for each fragmented material portion, determining dimensions of the fragmented material portion based on 3D point locations that are located on or proximate to the identified 2D boundaries of the fragmented material portions.

10. The method of claim 1 wherein processing the 2D image data to identify image features of the fragmented material portions comprises using the identified 3D point locations to identify boundaries between fragmented material portions in the 2D image data.

11. The method of claim 1 further comprising displaying at least one of:
   the 2D image;
   a preview of the 2D image;
   a processed view of the 2D image providing an indication of fragmented material portions within the region of interest;
   a fragmented material portion size attribute;
   a fragmented material portion volume attribute;
   a distance between a fragmented material portion and a 3D sensor operable to generate the 3D point locations;
   a determined slope stability associated with the region of interest of the material;
   a 3D representation of an orientation of the region of interest; and
   a view of the 2D image superimposed on a surface of the 3D representation.

12. The method of claim 1 wherein using the identified 3D point locations to determine dimensional attributes comprises using the identified 3D point locations to determine a scale associated with at least some of the identified image features in the 2D image data.

13. The method of claim 12 wherein using the identified 3D point locations to determine a scale associated with identified image features comprises using the identified 3D point locations to determine a scale associated with each identified image feature in the 2D image data.

14. The method of claim 1 wherein using the identified 3D point locations to determine dimensional attributes comprises using the identified 3D point locations to determine an orientation of the region of interest in the 2D image data.

15. The method of claim 1 wherein using the identified 3D point locations to determine dimensional attributes comprises using the identified 3D point locations to estimate a volume of each of the fragmented material portions.

16. The method of claim 1 wherein using the identified 3D point locations to determine dimensional attributes comprises using the identified 3D point locations to estimate a fragment size associated with each of the fragmented material portions.

17. The method of claim 16 further comprising generating a fragment size distribution based on the determined fragment size for the fragmented material portions within the region of interest.

18. The method of claim 17 further comprising converting the fragment size distribution into a corresponding sieve analysis result.

19. The method of claim 1 further comprising determining a spatial orientation of the identified 3D point locations.

20. The method of claim 19 wherein the two-dimensional (2D) image data and the plurality of three dimensional (3D) point locations are acquired by at least one sensor and further comprising determining a spatial orientation of the at least one sensor and wherein determining the location of the identified 3D point locations comprises determining the location of the identified 3D point locations with respect to the sensor.

21. The method of claim 20 further comprising determining a position of the at least one sensor by receiving a global positioning system (GPS) signal.

22. The method of claim 1 wherein receiving the two-dimensional (2D) image data and receiving the plurality of three dimensional (3D) point locations comprises receiving a first dataset and further comprising:
receiving at least one additional dataset including two-dimensional (2D) image data representing the region of interest of the material and an associated plurality of three dimensional (3D) point locations within the region of interest and wherein using identified 3D point locations to determine dimensional attributes comprises using identified 3D point locations from each of the first dataset and at least one additional dataset to determine the dimensional attributes of the fragmented material portions.

23. The method of claim 22 wherein the first dataset and the at least one additional dataset are acquired from different perspective viewpoints.

24. The method of claim 22 further comprising using the identified 3D point locations in the first dataset and the at least one additional dataset to estimate an overall volume of a stockpile of fragmented material portions.

25. The method of claim 1 wherein receiving the two-dimensional (2D) image data and receiving the plurality of three dimensional (3D) point locations comprises receiving a first dataset representing a first region of interest and further comprising:
receiving at least one additional dataset including two-dimensional (2D) image data representing at least one additional region of interest and an associated plurality of three dimensional (3D) point locations within the additional region of interest;
using identified 3D point locations to determine dimensional attributes within each of the first region of interest and the additional region of interest; and
generating a location map including the first region of interest and the at least one additional region of interest using the first dataset and the at least one additional dataset together with the identified 3D point locations.

26. The method of claim 25 wherein generating the location map further comprises associating the determined dimensional attributes of the fragmented material portions with the respective regions of interest.

27. The method of claim 1 further comprising receiving a change to at least one of the region of interest and the identified image features and determining updated dimensional attributes of the fragmented material portions.

28. An apparatus for performing a fragmentation assessment of a material including fragmented material portions, the apparatus comprising:
an image sensor for receiving two-dimensional (2D) image data representing a region of interest of the material;
a three dimensional (3D) sensor for receiving a plurality of 3D point locations on surfaces of the fragmented material portions within the region of interest;
a processor circuit operably configured to:
process the 2D image data to identify features of the fragmented material portions;
identify 3D point locations within the plurality of three dimensional (3D) point locations that correspond to identified features in the 2D image; and
use the identified corresponding 3D point locations to determine dimensional attributes of the fragmented material portions.

29. The apparatus of claim 28 wherein the 3D sensor is operably configured to generate a 3D point cloud of the region of interest.

30. The apparatus of claim 29 wherein said processor circuit is operably configured to determine a distance between the 3D sensor and a reference 3D point location within the region of interest.

31. The apparatus of claim 29 wherein said processor circuit is operably configured to:
determine a spatial orientation of the identified 3D point locations;
process said 3D point cloud to determine slope attributes associated with the region of interest of the material, the slope attributes comprising at least one of:
a slope angle associated with the region of interest of the material; and
a slope height associated with the region of interest of the material;
use the dimensional attributes of the fragmented material portions and the slope attributes to determine slope stability.

32. The apparatus of claim 31 wherein said processor circuit is operably configured to generate a warning signal when one of:
the distance between the 3D sensor and a reference 3D point location within the region of interest is less than a safe working distance of the region of interest; or
the determined slope stability is less than a minimum required slope stability.

33. The apparatus of claim 28 wherein the 3D sensor comprises a first image sensor, a second image sensor, and a third image sensor, the second image sensor being spaced apart from the first image sensor by a first fixed distance and the third image sensor being spaced apart from the first image sensor by a second fixed distance, the second fixed distance being greater than the first fixed distance, and wherein the 3D sensor is configured to receive a first 2D image from a first image sensor and selectively receive a second image from one of a second image sensor and a third image sensor, and wherein said processor circuit is operably configured to process the 2D images to determine the 3D point locations.

34. The apparatus of claim 33 wherein said processor circuit is operably configured to determine a degree of disparity value between corresponding pixels in the two 2D images, the degree of disparity value providing an indication of a suitability of the 2D images for processing to determine the 3D point locations and further comprising displaying the degree of disparity value on a display.

35. The apparatus of claim 28 wherein said processor circuit is operably configured to process the 2D image data to identify image features by identifying 2D boundaries associated with the fragmented material portions and to identify 3D point locations by correlating 3D point locations that are located on or proximate to the identified 2D boundaries of the fragmented material portions.

36. The apparatus of claim 35 wherein said processor circuit is operably configured to use the identified 3D point locations to determine dimensional attributes by, for each fragmented material portion, determining dimensions of the fragmented material portion based on 3D point locations that are located on or proximate to the identified 2D boundaries of the fragmented material portions.

37. The apparatus of claim 28 wherein said processor circuit is operably configured to process the 2D image data to identify image features of the fragmented material portions by using the identified 3D point locations to identify boundaries between fragmented material portions in the 2D image data.

38. The apparatus of claim 28 further comprising a display for displaying at least one of:
the 2D image;
a preview of the 2D image;
a processed view of the 2D image providing an indication of fragmented material portions within the region of interest;
a fragmented material portion size attribute;
a fragmented material portion volume attribute;
a distance between a fragmented material portion and a 3D sensor operable to generate the 3D point locations;
a determined slope stability associated with the region of interest of the material;
a 3D representation of an orientation of the region of interest; and
a view of the 2D image superimposed on a surface of the 3D representation.

39. The apparatus of claim 28 wherein said processor circuit is operably configured to use the identified 3D point locations to determine a scale associated with at least some of the identified image features in the 2D image data.

40. The apparatus of claim 28 wherein said processor circuit is operably configured to use the identified 3D point locations to determine an orientation of the region of interest in the 2D image data.

41. The apparatus of claim 40 wherein said processor circuit is operably configured to use the identified 3D point locations to determine a scale associated with identified image features by using the identified 3D point locations to determine a scale associated with each identified image feature in the 2D image data.

42. The apparatus of claim 28 wherein said processor circuit is operably configured to use the identified 3D point locations to estimate a volume of each of the fragmented material portions.

43. The apparatus of claim 28 wherein said processor circuit is operably configured to use the identified 3D point locations to estimate a fragment size associated with each of the fragmented material portions.

44. The apparatus of claim 43 wherein said processor circuit is operably configured to generate a fragment size distribution based on the determined fragment size for the fragmented material portions within the region of interest.

45. The apparatus of claim 44 wherein said processor circuit is operably configured to convert the fragment size distribution into a corresponding sieve analysis result.

46. The apparatus of claim 28 further comprising a position sensor operable to determine a position of the apparatus in a geodetic coordinate system.

47. The apparatus of claim 46 wherein the position sensor comprises a global positioning system (GPS) receiver.

48. The apparatus of claim 28 further comprising an orientation sensor operable to determine a spatial orientation of the apparatus and wherein the processor circuit is operably configured to determine the location of the identified 3D point locations by determining the location of the identified 3D point locations with respect to the apparatus.

49. The apparatus of claim 28 wherein the 2D image data and the plurality of 3D point locations comprises a first dataset and wherein said processor circuit is further operably configured to:
receive at least one additional dataset including 2D image data representing the region of interest of the material and an associated plurality of 3D point locations within the region of interest; and
determine dimensional attributes by using identified 3D point locations from each of the first dataset and at least one additional dataset to determine the dimensional attributes of the fragmented material portions.

50. The apparatus of claim 49 wherein the first dataset and the at least one additional dataset are acquired from different perspective viewpoints.

51. The apparatus of claim 49 wherein said processor circuit is operably configured to use the identified 3D point locations in the first dataset and the at least one additional dataset to estimate an overall volume of a stockpile of fragmented material portions.

52. The apparatus of claim 28 wherein the 2D image data and the plurality of 3D point locations comprises a first dataset and wherein said processor circuit is further operably configured to:
receive at least one additional dataset including 2D image data representing at least one additional region of interest and an associated plurality of 3D point locations within the additional region of interest;
use identified 3D point locations to determine dimensional attributes within each of the first region of interest and the additional region of interest; and
generate a location map including the first region of interest and the at least one additional region of interest using the first dataset and the at least one additional dataset together with the identified 3D point locations.

53. The apparatus of claim 52 wherein the processor circuit is operably configured to generate the location map by associating the determined dimensional attributes of the fragmented material portions with the respective regions of interest.

54. The apparatus of claim 28 wherein the processor circuit is located on a cloud server in communication with the image sensor and the three dimensional (3D) sensor for receiving the 2D image and the plurality of 3D point locations.

* * * * *